United States Patent [15] 3,662,348

Weiss [45] May 9, 1972

[54] MESSAGE ASSEMBLY AND RESPONSE SYSTEM

[72] Inventor: Alfred Weiss, Ossining, N.Y.

[73] Assignee: International Business Machines Corporation, Armonk, N.Y.

[22] Filed: June 30, 1970

[21] Appl. No.: 51,235

[52] U.S. Cl. .......... 340/172.5
[51] Int. Cl. .......... G06f 7/22
[58] Field of Search .......... 340/172.5

[56] References Cited

UNITED STATES PATENTS

| | | | |
|---|---|---|---|
| 3,437,998 | 4/1969 | Bennett et al. | 340/172.5 |
| 3,456,243 | 7/1969 | Cass | 340/172.5 |
| 3,448,436 | 6/1969 | Machol, Jr. | 340/172.5 |
| 3,435,423 | 3/1969 | Fuller et al. | 340/172.5 |
| 3,292,153 | 12/1966 | Barton et al. | 340/172.5 |
| 3,512,240 | 7/1970 | Bahrs et al. | 340/172.5 |
| 3,490,006 | 1/1970 | Macon et al. | 340/172.5 |

*Primary Examiner*—Paul J. Henon
*Assistant Examiner*—Sydney R. Chirlin
*Attorney*—Hanifin and Jancin and John J. Goodwin

[57] ABSTRACT

An information system which may be employed as a voice answer back system for assembling and transmitting separate messages on separate output lines. The basic components of the system are a rotating, fixed head sequential memory file, an associative memory, and a group of buffer storage units. Address keys for the words of the messages are obtained from a central processing unit. The rotating memory contains the entire file of message words stored in equal length segments of digital signals and each are identified by a key address. Message words may consist of a number of segments, each having the same key address and further identified by consecutive segment numbers. As the sequential memory is rotated, the key addresses of the segments are compared with the key addresses in the associative memory; and when matches occur, the segments are retained in buffer storages. As each segment of a key address is obtained, the segment is transferred to the output of the system.

9 Claims, 8 Drawing Figures

INVENTOR
ALFRED WEISS

BY John J. Goodwin
ATTORNEY

MESSAGE ASSEMBLY AND RESPONSE SYSTEM

BACKGROUND OF THE INVENTION

1. Field of the Invention

The present invention relates to the field of information processing and, more particularly, to a data processing system for assembling digitally coded messages from the file dictionary.

2. Prior Art

Associative memories and rotating memories have been used in combination for applications such as information retrieval, however, the use of the combination with buffer storages for assembling equal length data segments for forming a plurality of messages according to the present invention is unique.

SUMMARY OF THE INVENTION

An object of the present invention is to provide an information processing system for assembling digitally coded messages.

Another object of the present invention is to provide a system for rapid retrieval and simultaneous assembly of messages from words stored in equal length bit sequences.

A still further object of the present invention is to provide a system for assembling separately stored digital words into separate messages for continuous transmission over a plurality of output lines.

The foregoing and other objects features and advantages of the invention will be apparent from the following more particular description of preferred embodiments of the invention.

Figure 1:
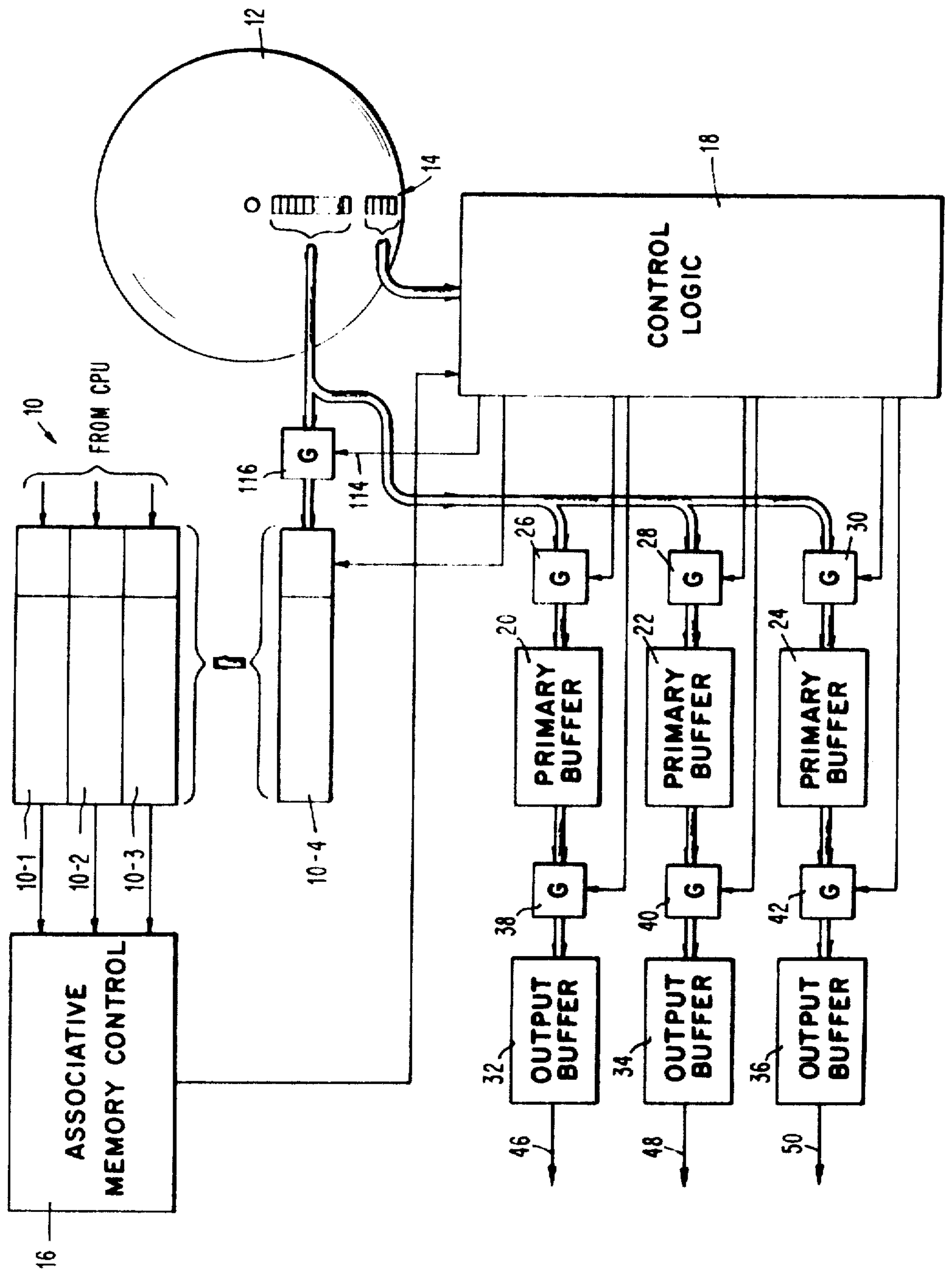
FIG. 1 is a schematic block diagram of an information processing system in accordance with the principles of the present invention.

Referring to FIG. 1, a schematic block diagram of the present invention is shown adapted to be employed as a voice answer back system. However, as will be later indicated, the invention may be used for other applications such as processing digital image information.

In voice answer back systems, one or more subscribers enter requests over one or more input lines by means of a keyboard or other suitable terminals. The input requests are received and processed by a central processing unit (CPU) and, under program control, the key addresses for the appropriate answer messages are selected and assembled. Structures for producing key addresses for answer messages in response to input signals are known in the art. A typical structure is described in the publication "Component Description IBM 7770 Audio Response Unit, Model 3," File No. 7770-09, Order No. GA 27-2712-1, obtainable from IBM branch offices.

In FIG. 1, the system includes three subscriber lines, for purposes of explanation, however, a greater number of subscriber lines may be used, the maximum number being dependent on factors such as storage density, memory speed and the like. It is presumed that the three input messages have been received by a control processing unit and the appropriate key addresses for the answer messages have been obtained. The key addresses, which are composed of 10 binary bits plus six additional zero bits indicating the first segment number are entered into the storage locations of a conventional associative memory 10. The first storage location 10-1 is dedicated to key addresses related to messages for the first output line. The second and third storage locations 10-2 and 10-3 are dedicated to key addresses for the second and third output lines respectively. The associative memory 10 includes an argument register 10-4. A sixteen bit digital word (address plus segment number) is placed in argument register 10-4 and a compare operation takes place. If the word in argument register 10-4 matches a word in the associative memory 10, a match indication is produced from the storage location containing the word.

The system also includes a rotating, fixed head sequential memory file 12 hereinafter referred to as the disc file. The disc file 12 is a conventional device including a rotation disc containing a plurality of tracks having digital information magnetically stored thereon. In the present embodiment, the disc file 12 includes 20 tracks and a set of twenty read heads 14. As the tracks pass beneath the heads 14, the digital information is read out. Sixteen of the tracks contain the data, and the remaining four tracks are used for storing timing digits.

The information on the tracks is divided into segments, and a plurality of segments taken in sequence may form a message word. The entire active dictionary of words is stored on disc 12. The first bit position on each of the 16 tracks of a data segment is used to designate the key address of the segment and the segment number. Thus, each segment starts with a 16 bit word, 10 bits for the key address and six bits for the segment number. The remainder of the segment includes 20 words of data of 16 bit length. The remaining four tracks are used for timing pulses. One track is used to produce a home pulse (H pulse) at the beginning of each revolution of the disc 12. Another track is used for clock pulses (C pulses), which occur before each of the 16 bit words of each segment. Thus, there are 21 clock pulses produced for each segment on disc 12. Another track is used to produce 320 equally spaced output pulses for each revolution of disc 12 and the fourth track is used to produce an associate pulse (A pulse) at the beginning of each segment.

The system of FIG. 1 also includes a control unit 16 for the associative memory 10, a logic control unit 18 for the system, three primary buffer storage units 20, 22 and 24 with input gate circuits 26, 28 and 30 respectively. Three output buffer storage units 32, 34 and 36 having input gate circuits 38, 40 and 42 respectively and a gate circuit 116 for argument register 10-4 are also included in the system. The first, second and third output messages will appear as digital signals on output leads 46, 48 and 50, respectively.

In operation, three key address for message words for output lines 46, 48 and 50 are entered from the CPU into associative memory storage locations 10-1, 10-2 and 10-3, respectively. The address consists of a 10 bit key and a six bit segment number, which initially is 000000. The key for the first segment of a message word has a segment number zero, the next key for the same word has a segment number one (000001) ans so on. A small part of the disc revolution time at the beginning of a revolution is reserved for transferring the contents of the primary buffers to the output buffers. As the segments on disc 12 rotate under heads 14, the first 16 bits of a segment represent the key and segment number for the segment. An associate pulse (A pulse) is generated just prior to these 16 bits and is applied to the control logic means 18, which produces a gate pulse for gating means 116 to permit the 16 bit key and segment number to enter argument register 10-4 to be compared with the contents of memory locations 10-1, 10-2 and 10-3. The following 20 words in the segment then pass through normally open gates 26, 28 and 30 to enter and be stored in primary buffer storages 20, 22 and 24. The data is placed in all three stores 20, 22 and 24 because it cannot be known whether a match will occur with location 10-1, 10-2 or 10-3.

If no match occurs, the key and segment word of the next segment is entered in argument register 10-4, and the twenty words in this segment are entered in buffer storages 26, 28 and 30. This process continues until a key and segment word is entered into associate register 10-4 and matches one of the key and segment words in one of the locations 10-1, 10-2 or 10-3. When a match occurs, a signal is produced in the associative memory control means 16 which closes the gate associated with the appropriate buffer storage. Presume that the word in argument register 10-4 matched that in location 10-2. Gate 28 is closed after the twenty segment words are entered in buffers 20, 22 and 24. This prevents any further segment words from entering primary buffer 22 and writing over the segment entered therein after the match.

Disc 12 continues to rotate, and the key and segment number for each segment is read out and entered into association register 10-4 to test for a match. The other twenty words of the segment are entered into buffer storages 20 and 24. When a next match occurs, for example, on the key and segment number is associative memory location 10-1, gate 26 is closed after the 20 segment words are entered into buffer storages 20 and 24, thereby preventing any further entries into buffer 20. The operation continues until primary buffer storages 20, 22 and 24 contain segment words related to the key and segment numbers stored in memory locations 10-1, and 10-2 and 10-3 respectively.

Signals from control logic means 18 open the normally closed gates 38, 40 and 42, and the contents of primary buffer storages 20, 22 and 24 are transferred into output buffer storages 32, 34 and 36 respectively. Upon the occurrence of a pulse from control logic means 18, each of the 20 stored words in output buffer storages 32, 34 and 36 are sequentially transferred into a shift register located in each buffer, and the words are sent out in sequence on output lines 46, 48 and 50.

Thus, the described system forms output messages by selecting equal length data segments from a relatively high speed disc memory in accordance with matches with key addresses in an associative memory. The key addresses and the stored segments include segment numbers so that different numbers of segments can be obtained in sequence for different length message words. Buffer storages are employed to enable the retrieved segments to be transmitted continuously on the output lines.

Figure 2:
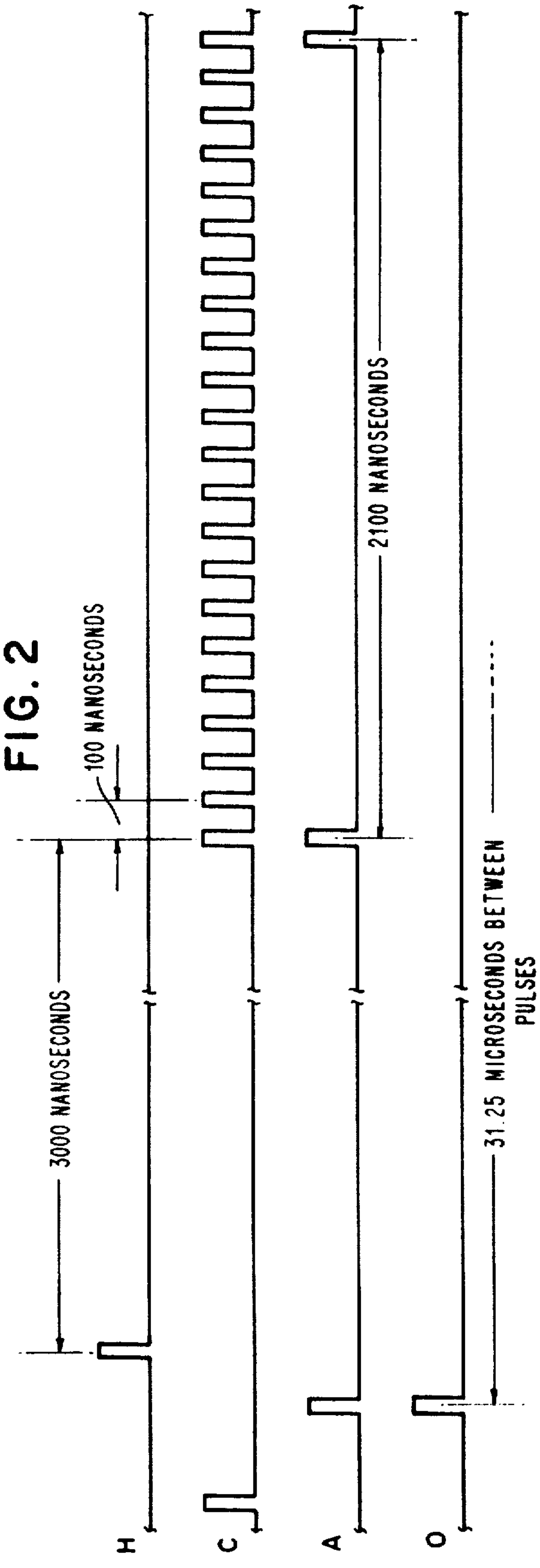
FIG. 2 is an illustration of the system timing sequence.

Referring to FIG. 2, a timing diagram is shown illustrating the timing pulses obtained from the four tracks of disc file 12. The home pulse H occurs once for each revolution of the disc and determines the start of each revolution. After a time delay such as 3,000 nanoseconds to allow time for data to be transferred from the primary to the output buffer storages the clock pulses C for the first segment occur. The first clock pulse occurs just prior to the 16 bit key and segment number for the first segment and, therefore, an associate pulse A occurs at this time. Twenty C pulses then follow, occurring between the words on the segment.

The output pulses are independent of the other pulses. After the output buffers 32, 34 and 36 are filled, the output pulses are used to transfer the bits into the internal shift registers for transmission. For a 10 millisecond rate of disc rotation and a spacing of 31.25 microseconds between output pulses, there will be 320 output pulses equally spaced on the track on disc 12 with one occurring just prior to the H pulse.

If a disc having a rotation time of 10 milliseconds is used, 4,760 segments can be stored. The C pulses are spaced 100 nanoseconds apart, the A pulses are spaced 2,100 nanoseconds apart, the output pulses are spaced 31.25 microseconds apart and the first segment occurs 3,000 nanoseconds after the H pulse.

Figure 3:
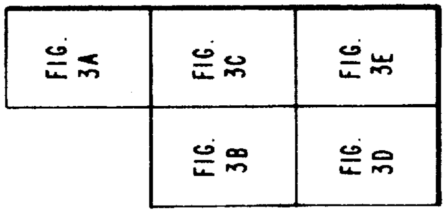
FIG. 3 is a diagram indicating how the various
Figure 3A:
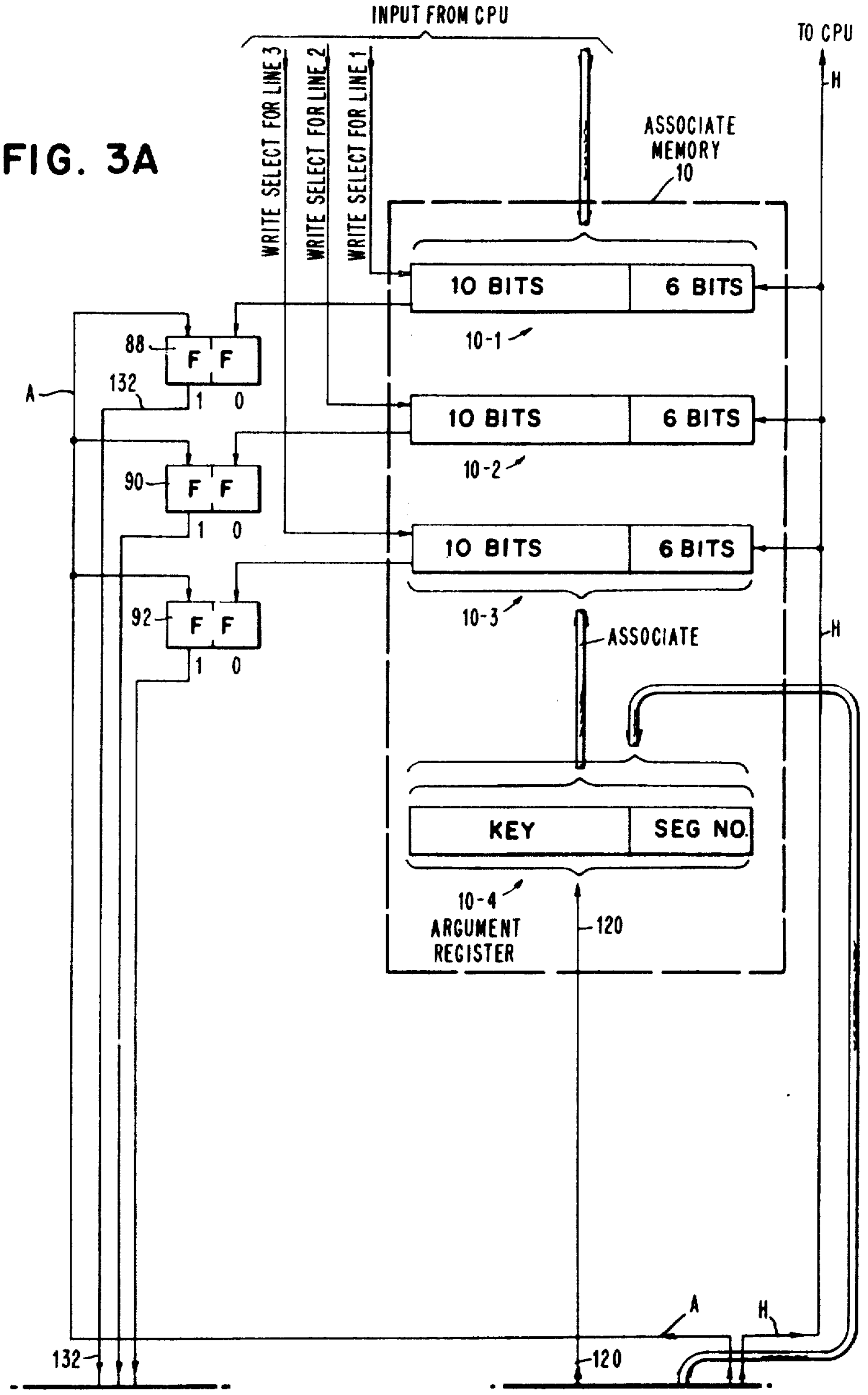
FIGS. 3A, 3B, 3C, 3D and 3E are arranged to illustrate a more detailed schematic diagram of an embodiment of the present invention.
Figure 3B:
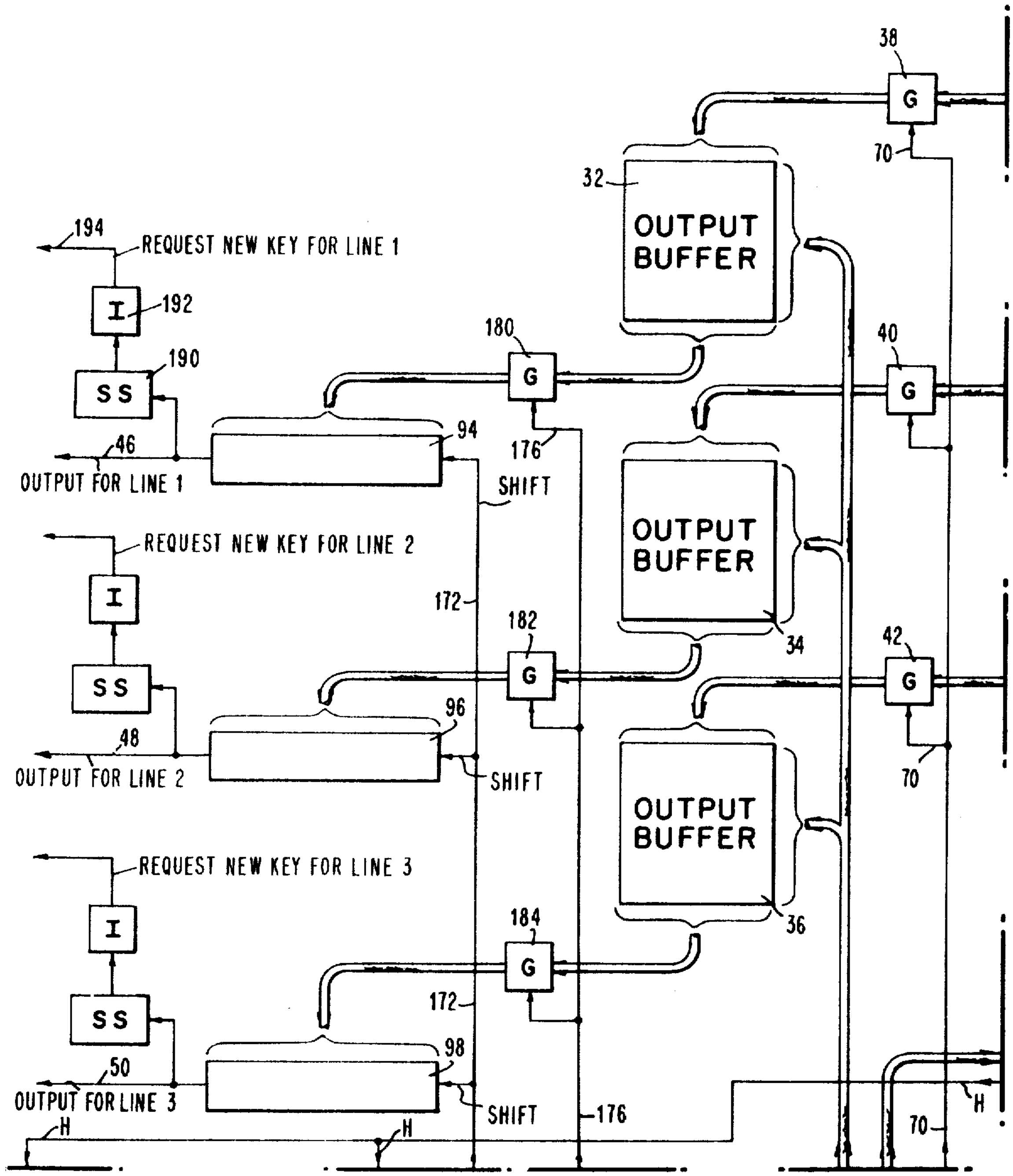
Figure 3C:
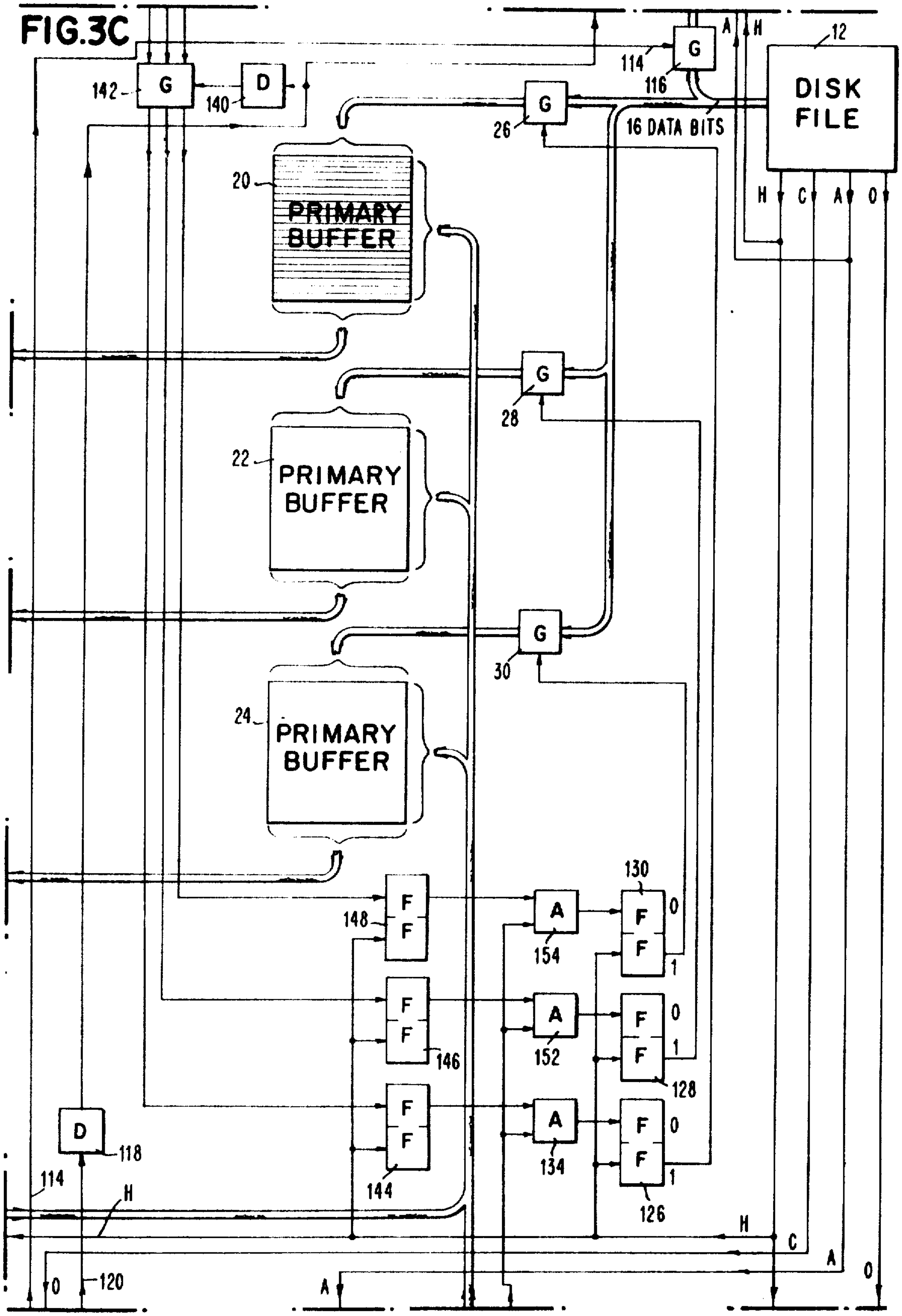

FIG. 3 illustrates how FIGS. 3A through 3E should be arranged. FIGS. 3A through 3E show a detailed schematic diagram of the system shown in FIG. 1. In FIG. 3C, the disc file 12 is shown which produces the segment words and the timing pulses. The timing pulses are transmitted on the lines H, C, A and O representative of the home pulse, the clock pulses, the associate pulses and the output pulses respectively. FIG. 3A shows the associative memory 10. Associative memory 10 may be the same as is shown and described in detain in U.S. Pat. No. 3,317,898, entitled "Memory System," issued May 2, 1967 to H. Hellerman and assigned to the present assignee. In FIG. 3C, the match indicator flip-flops 88, 90 and 92 are designated 685 in the patent, the "write select lines" are designated 611 in the patent, and the wires between flip-flops 88, 90 and 92 and memory locations 10-1, 10-2 and 10-3 are designated 625 in the patent.

The primary buffers, output buffers and control logic are shown in FIGS. 3B through 3E. The operation of the circuits shown in FIGS. 3A through 3E is described in the following sections entitled "Transfer Operations," "Association Operatin" and "Output Operation."

TRANSFER OPERATION

Figure 3D:
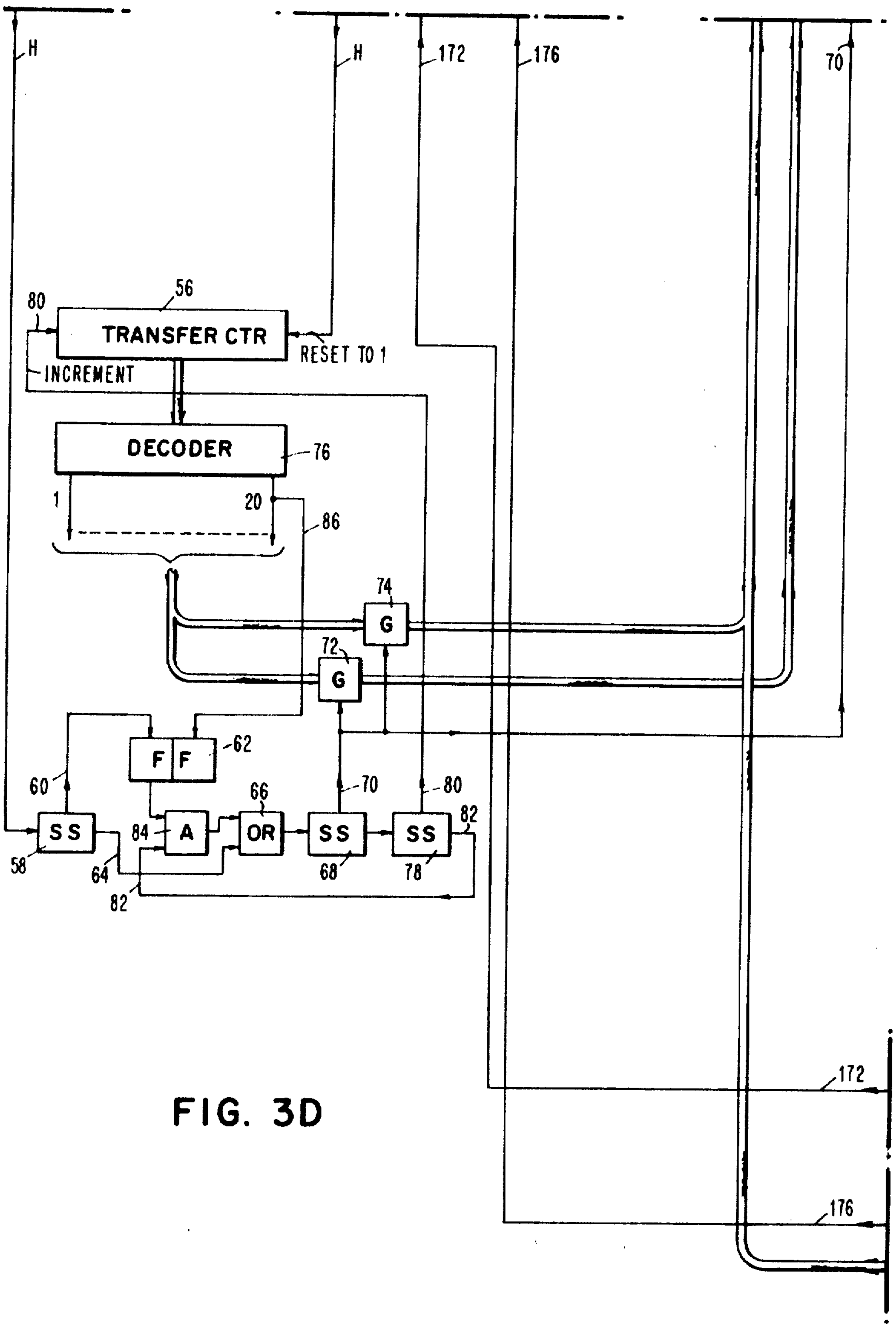

At the home position of disc file 12, a home pulse will appear on wire H. This H pulse resets the transfer counter 56 to "one." The H pulse also turns "ON" single shot 58 (FIG. 3D). This will produce a pulse on wire 60 which sets flip-flop 62 to its "1" state. When single shot 58 goes "OFF" after a time elapse, a pulse appears on wire 64 which extends through OR circuit 66 and turns "ON" single shot 68. This produces a pulse on wire 70 which extends to gates 72 and 74. The pulse on wire 70 will gate the output of decoder 76 to the address lines of the primary buffers 20, 22 and 24 and the output buffers 32, 34 and 36. Wire 70 also extends to gates 38, 40 and 42 (FIG. 3B). These gates connect the output lines of the primary buffers to the input lines of the output buffers. In this manner, the first (number 1) register of each of the 20 registers in each of the primary buffers will be gated to the first (number 1) register of each of the output buffers. When single shot 68 goes "OFF," it turns on single shot 78. The pulse on wire 80 from single shot 78 is used to increment the transfer counter 56. When single shot 78 goes "OFF," a pulse appears on its output wire 82 which extends through AND circuit 84, and OR circuit 66 to again turn "ON" single shot 68. It will be noted that the transfer counter 56 is now at count "2" which means that the second (number 2) register of each of the primary buffers is connected to the second (number 2) register in each output buffer. The aforesaid operation then repeats until the transfer counter 56 is incremented to count 20. At this time a pulse extends via wire 86 from decoder 76 to turn off flip-flop 62. When flip-flop 62 is in its "0" state, the recycling of the single shot circuit is prevented because AND circuit 84 is not enabled.

ASSOCIATION OPERATION

The H pulse from disc file 12 is also used to reset flip-flops 144, 146 and 148 (FIG. 3C) to their "0" state and sets flip-flops 126, 128, and 130 to their "1" state. When the A pulse occurs, it sets flip-flops 88, 90 and 92 (FIG. 3A) to their "1" state. The A pulse resets the input address counter 110 (FIG. 3E) to "0." The A pulse is also applied through DELAY circuit 106 to set flip-flop 108 to its "1" state. When the input address counter 110 is at count "0," wire 114 is active to gate the first 16 data bits of a segment to the argument register 10-4 of the associated memory 10. This is done by enabling gate 116. When flip-flop 108 is in its "1" state, it enables AND circuit 150 so that the C pulses are effective to increment the input address counter 110. It will be noted that the first C pulse after the A pulse passes though AND circuit 150. The C pulse and the following C pulses increment the input address counter 110. The output of DELAY circuit 106 extends through DELAY circuit 118 to provide the association pulse for the associative memory 10. If there is a match in the associative memory, the corresponding match indicator flip-flops 88, 90 or 92 for that word will be left in its "1" state. For any word that does not match, its match indicator flip-flop will be reset to "0". Wire 122 enables gate 124 to apply output of decoder circuit 112 to the address lines of the three primary buffers 20, 22 and 24. Gates 26, 28 and 30 are enabled because flip-flops 126, 128 and 130 are all three in their "1" state at the beginning. This means that the first segment read from the disc file 12 will be loaded into all three primary buffers 20, 22 and 24. It should be noted that directly following the A pulse, DELAY circuit 140 has an output which is applied to gate 142 in order to sample the match indicator flip-flop 88, 90 and 92. Any match indicator flip-flop that is on "1" at this time will set the corresponding flip-flops 144, 146 or 148 to its "1" state. Thus, the fact that a match occurred on a word in associative memory 10 is indicated and stored in one of the flip-flops 144, 146 or 148. Flip-flop 144 corresponds to the word in the associate memory storage location 10-1. Flip-flop 146 corresponds to the word in location 10-2 and flip-flop 148 corresponds to the word in location 10-3. When the input address counter 110 goes to count "20," the DECODER 112 will have an output on wire 136 which resets flip-flop 108 to its "0" state. The same pulse extends through the DELAY circuit 138 to AND circuits 134, 152 and 154. If anyone of the flip-flops 144, 146 or 148 are in their "1" state, the corresponding AND circuits 134, 152 or 154 will be enabled and the output of the DELAY unit 138 is effective to reset one of the flip-flops 126, 128 or 130 to its "0" state. When one of the flip-flops 126, 128 or 130 is reset to its "0" state, it means that one of the gates 26, 28 or 30 will be disabled and the particular primary buffer which is connected to the gate will be disconnected from disc file 12 for the remainder of the revolution.

In case of a mismatch, that is, if the word in the argument register 10-4 does not match any of the words in locations 10-1, 10-2 or 10-3, the corresponding match indicator flip-flop will be reset to its "0" state and therefore, it is necessary to set all three match indicators to the "1" state each time an A pulse occurs. From the preceding circuit description, it should be evident how each of the primary buffers 20, 22 and 24 can be loaded during one revolution of the disc and the proper information retained in each of the primary buffers. In case there is no word in the associative memory or the word is such that it does not match in any revolution of the disc, the primary buffer corresponding to that word will be left loaded with all zeros because by design the last segment on the disc is loaded with all zeros.

On each revolution of the disc file, the H pulse is used to increment the six bit segment number stored in each storage location of associative memory 10.

THE OUTPUT OPERATION

The only requirement on the timing sequence shown in FIG. 2, in regard to the output pulses which are designated 0, is that no output pulse occurs during the transfer of data from the primary buffers to the output buffers. The last output pulse on the disc should occur sufficiently before the H pulse to allow an output sequence to take place.

Figure 3E:
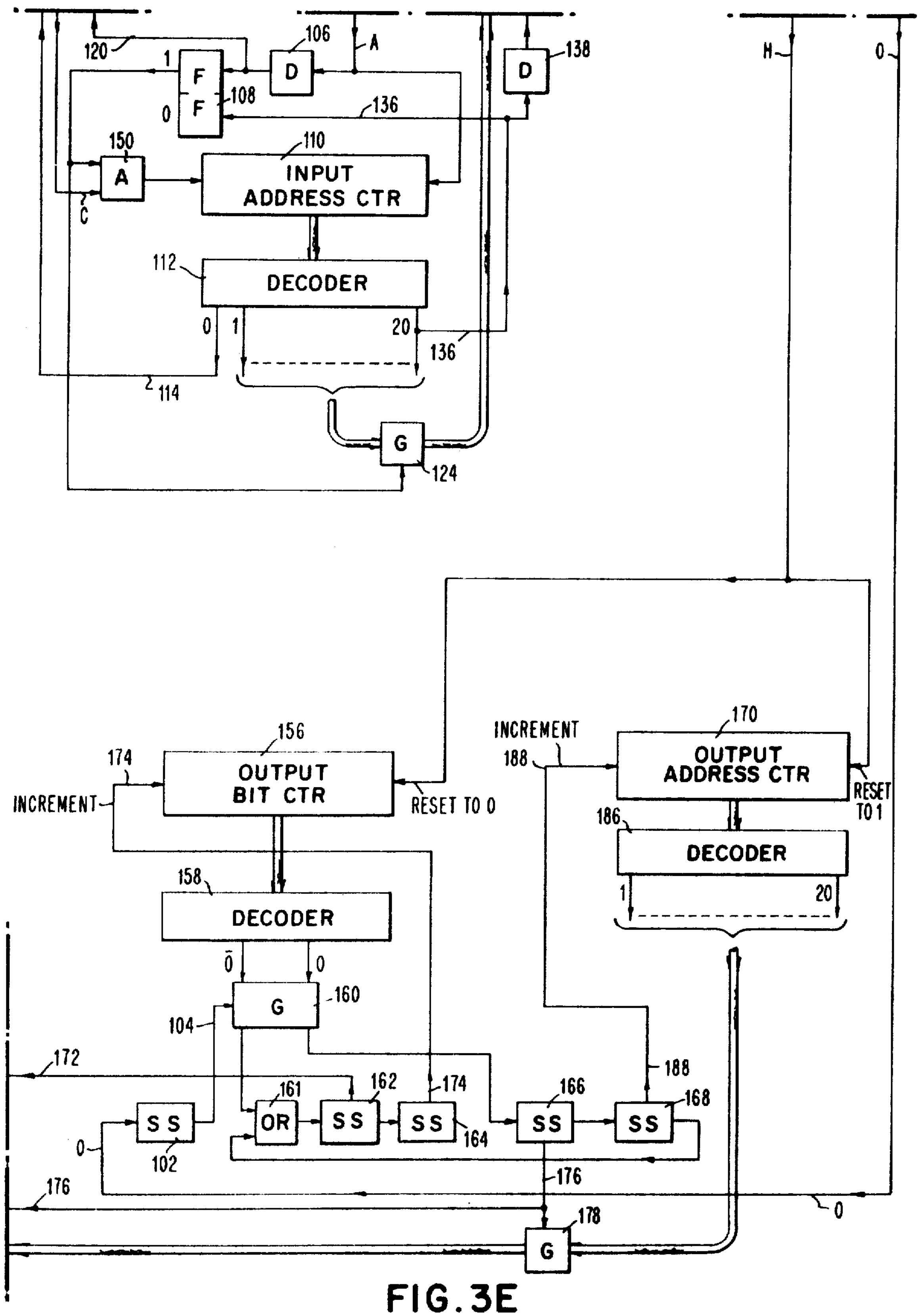

In FIG. 3E, it should first be noted that the H pulse resets the output bit counter 156 to "0" and the output address counter to "1." The output bit counter 156 is a modulo 16 counter which means that it counts from 0 to 15 and then reverts back to 0. It is reset by the H pulse each revolution, mainly in order to start it off at 0 for the first revolution.

The 0 pulse is applied to single shot 102 in order to turn it to its "ON" state. This provides a pulse on wire 104 which is applied to gate 160, which tests the output of decoder 158 to see whether or not the counter 156 is on "0." If counter 156 is not on "0," single shot 162 will be turned "ON." This provides a pulse on wire 172, which is the shift pulse for the output shift registers 94, 96 and 98. When single shot 162 goes "OFF," it turns "ON" single shot 164. This provides a pulse on wire 174, which increments the output bit counter 156. As explained before, if the output bit counter is standing on count "15," the pulse on wire 174 will cause it to revert back to "0." If the output bit counter 156 is on "0" when it is tested by the pulse on wire 104, single shot 166 will be turned "ON." This provides a pulse on wire 176 which is applied to gate 178 in order to gate the output of the decoder 186 to the address lines of the output buffers 32, 34 and 36. The pulse on wire 176 is also used to enable gates 180, 182, and 184, which gate the output lines of the output buffers to the output shift registers 94, 96 and 98. In this manner, the output shift register 94, 96 and 98 are loaded each time the output bit counter 156 goes to "0." When single shot 166 goes "OFF," it turns "ON" single shot 168 which produces a pulse on wire 188, which is used to increment the output address counter 170. When single shot 168 goes "OFF," a pulse is produced which turns "ON" single shot 162.

The way that the system is informed that all segments of a word have been sent on the output lines 46, 48 or 50, is by detecting that the output line level has dropped to "0." Referring to output line 46, it will be noted that this line extends to single shot 190. As long as there is sufficient "ones" on this output line 46, single shot 190 will have an output which is applied to the INVERTER circuit 192, thus causing wire 194 to be inactive. The time constant of single shot 190 is such that if, during an appreciable portion of the revolution of a disc, no "ones" exist on output line 46, single shot 190 will go "OFF." This will remove the input to INVERTER circuit 192 and allow line 194 to become active. The active state of line 194 is a signal to the computer that a new word can be loaded into the associative memory for the first line (i.e., line number 1).

An alternative to loading the last segment of the disc file 12 with all zeros, is to modify the system such that single shot 190 and the corresponding single shot circuits for the other output lines 48 and 50 are disconnected from the output lines 46, 48 and 50 and are instead respectively connected to the three output lines from gate 142 (FIG. 3C). Thus, if the disc makes a rotation without a match occurring, the single shot circuits will go "OFF."

In the case of a condition where there are not enough requests to completely fill all the storage locations 10-1, 10-2 and 10-3, in the associative memory, those words in the associative memory which are not loaded will cause mismatches on their corresponding match indicator flip-flops. This will mean that the particular primary buffer associated with a position in the associative memory that is not loaded with a valid word will end up all loaded with zeros. In this case, the corresponding output lines 46, 48 or 50 will have all zeros indicating no information.

What has been described is a message assembly and response system which accepts key addresses related to messages. The key addresses are stored in an associative memory and are compared with key addresses obtained from a disc file which also contains the system dictionary in the form of message words arranged in equal length segments. The key addresses in the associative memory and from the disc file are compared, and if matches occur, the related words of the segments are assembled in buffer storage devices and the resultant messages are sent out over appropriate output lines. An important feature of the invention is that the message words are stored in a number of equal segments thereby permitting a high speed disc file to be used in combination with an associative memory for the assembling of the messages. In a voice answer back application, the digital signals on the output lines may be applied to digital-to-analog converters so that the user may hear a voiced response at the receiving terminal.

For purposes of explanation, a rather simple system was described employing a three word associative memory and a disc file having 4,760 segments. It should be understood that practical systems can employ much larger associative memories and disc files which can contain a much larger dictionary. Also, the arrangement of the segments on the disc may be varied in accordance with the particular type structural units employed to implement the schematic diagrams.

If a large number of output lines are required in a particular system, the implementation may be varied such that instead of loading the primary buffers with each segment and retaining the segment in the appropriate buffer when a match occurs, a different arrangement of buffers may be employed which are loaded with a segment only when a match occurs. For example, a pair of buffers may be employed for each output line. When a match occurs, the related segment is loaded in the first buffer for the appropriate output line leaving the second buffer available for the segment of a subsequent match while the first buffer is being emptied out onto the output line. The arrangement of control circuits for this alternative scheme should be within the design capabilities of one skilled in the art.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for generating a plurality of digitally coded messages on a plurality of output lines comprising:

an associative memory means including an argument register and a plurality of storage locations for storing input key address data signals and digital segment numbers, a multi-track rotating memory means connected to said associative memory means and have a plurality of equal length segments of data stored thereon, each segment including unique key address data, word data which may be a sequential portion of a digitally coded message word, and a digital segment number indicating which sequential portion of the message word is stored in said segment, a plurality of buffer storage means connected to said rotating memory means, each of said buffer storage means being associated with a separate one of said storage locations of said associative memory means, control means connected to said rotating memory means, said associative memory means, and said plurality of buffer storage means for entering said key addresses from said rotating memory means into said argument register for comparison with said key addresses in said storage locations of said associative memory, and means connected to said plurality of buffer storage means and said rotating memory means and responsive to a match between said key address in said argument register and the key address in a storage location of said associative memory for storing the remainder of said segment corresponding to a matched key address in said buffer storage means.

2. A system according to claim 1 wherein said control means connected to said rotating memory means, said associative memory means, and said plurality of buffer storage means for entering said key addresses from said rotating memory means into said argument register for comparison with said key addresses in said storage locations of said associative memory also enters the remainder of said segments of data for each key address into each of said plurality of buffer means, and wherein said means connected to said plurality of buffer storage means and said rotating memory means and responsive to a match between said key address in said argument register and the key address in a storage location of said associative memory prevents any further data from entering the buffer storage means associated with the matched storage location.

3. A system according to claim 1 further including a second plurality of buffer storage means, each connected to the output of said first mentioned plurality of buffer storage means, means for transferring the contents of said first plurality of buffer storage means to said second plurality of buffer storage means, a plurality of output channels each connected to a separate one of said second plurality of buffer storage means, and means for transferring the contents of said second plurality of storage means to said output channels in sequence.

4. A system according to claim 1 wherein said plurality of equal length segments of data stored on said rotating memory relate to message words and wherein a single message word may be represented by a number of data segments, each of said data segments representing a single message word having the same key data and a separate segment number indicating the sequence in which said segments represent said single message word; and wherein said key address data signals in said associative memory storage locations include said representative segment numbers.

5. A system according to claim 4 wherein said control means includes means for incrementing the segment number of a key address data signal in said associative memory by an increment of one upon the occurrence of a match between said key address data signal and said key address in said argument register.

6. A voice answer back system for generating a plurality of digitally coded messages adapted to be converted to audio signals on a plurality of output lines comprising:

an associative memory means including an argument register, a plurality of storage locations for storing input key address data signals each having a key designation and a segment number designation, and a match indicator means for each of said plurality of storing locations, a multi-track rotating memory means connected to said associative memory means having a plurality of equal length segments of data representative of sequential portions of message words stored thereon, each of said equal length segments being preceded by stored key address signals having a key designation and a segment number representative of the data stored in said associated segment, said segment number being indicative of which sequential portion of the message word is stored in said segment, said rotating memory further including a read-out head for each of said storage tracks, a plurality of buffer storage means connected to the read-out heads of said rotating memory means, each of said buffer storage means being associated with a separate one of said storage locations of said associative memory means, control means connected to said read-out heads of said rotating memory means, said associative memory means and said plurality of buffer storage means for entering said key address signals from said rotating memory means into said argument register for comparison with said key address signals in said storage locations of said associative memory, said match indicator means being set to a given state when a match occurs between the contents of the argument register and the contents of the related storage locations, and means connected to said plurality of buffer storage means, said read-out heads of said rotating memory means and responsive to a match and said match indicator means for storing the segment of data corresponding to a matched key address in said buffer storage means.

7. A system according to claim 6 wherein said control means connected to said read-out heads of said rotating memory means, said associative memory means, and said plurality of buffer storage means for entering said key addresses from said rotating memory means into said argument register for comparison with said key addresses in said storage locations of said associative memory also enters the remainder of said segments of data for each key address into each of said plurality of buffer means, and wherein said means connected to said plurality of buffer storage means and said read-out heads of said rotating memory means and responsive to a match between said key address in said argument register and the key address in a storage location of said associative memory prevents any further data from entering the buffer storage means associated with the matched storage location.

8. A system according to claim 6 further including a second plurality of buffer storage means, each connected to the output of said first mentioned plurality of buffer storage means, means for transferring the contents of said first plurality of buffer storage means to said second plurality of buffer storage means, a plurality of output channels, each connected to a separate one of said second plurality of buffer storage means, and means for transferring the contents of said second plurality of storage means to said output channels in sequence.

9. A system according to claim 6 wherein said control means includes means for incrementing the segment number of a key address data signal in said associative memory by an increment of one upon the occurrence of a match between said key address data signal and said key address in said argument register.

* * * * *